United States Patent [19]

Ashworth

[11] Patent Number: 5,610,323
[45] Date of Patent: Mar. 11, 1997

[54] METHOD OF TESTING PIPES FOR LEAKAGE

[75] Inventor: Roger P. Ashworth, Loughborough, England

[73] Assignee: British Gas plc, London, England

[21] Appl. No.: 613,585

[22] Filed: Mar. 12, 1996

[30] Foreign Application Priority Data

Mar. 22, 1995 [GB] United Kingdom ............... 9505815

[51] Int. Cl.$^6$ ................................................. G01M 3/28
[52] U.S. Cl. ........................................ 73/40.5 R; 73/49.1
[58] Field of Search ............................... 73/40.5 R, 49.1

[56] References Cited

U.S. PATENT DOCUMENTS

| | | | |
|---|---|---|---|
| 3,756,072 | 9/1973 | MacMurray | 73/40.5 R |
| 4,571,986 | 2/1986 | Fujii et al. | 73/49.1 |
| 5,170,657 | 12/1992 | Maresca, Jr. et al. | 73/40.5 R |
| 5,201,212 | 4/1993 | Williams | 73/40.5 R |
| 5,367,797 | 11/1994 | Zaim | 73/49.2 |

FOREIGN PATENT DOCUMENTS

| | | |
|---|---|---|
| 1299018 | 12/1972 | United Kingdom. |
| 1301851 | 1/1973 | United Kingdom. |
| WO91/14164 | 9/1991 | WIPO. |

*Primary Examiner*—Michael Brock
*Attorney, Agent, or Firm*—Larson and Taylor

[57] ABSTRACT

Air is passed under pressure into a pipe under test and into a reference chamber connected to the pipe by a valve while recording at intervals of every few seconds the temperature in the reference chamber, the temperature in the pipe and the absolute pressure in the reference chamber. When the test pressure has been reached the valve is closed and the differential pressure between the pipe and the reference chamber is measured. The valve is opened to equalize the pressure and then closed again and the differential pressure drift rate is measured. This is repeated several times. A computer is used to calculate a creep prediction curve. A comparison is made to see whether the pressure drift rate due to creep and leak only in the pipe independent of any temperature change in the pipe is trending towards crossing the curve or not.

2 Claims, 2 Drawing Sheets

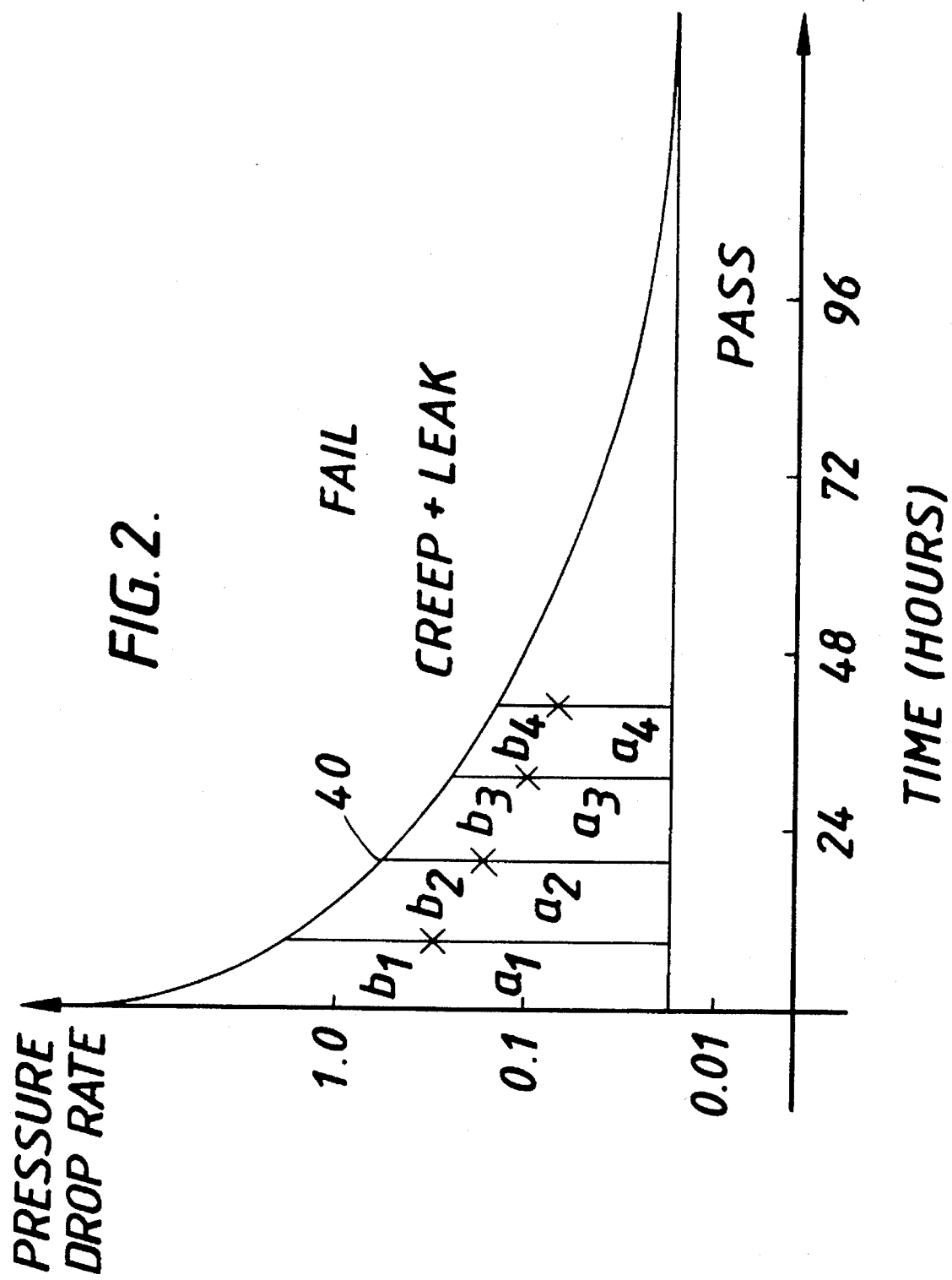

METHOD OF TESTING PIPES FOR LEAKAGE

BACKGROUND OF THE INVENTION

The invention relates to testing isolated buried thermoplastic pipes for leakage.

Leakage detection of distribution pipe is performed by measuring any pressure decay rate during a pneumatic pressure test. The installation is pressurised to 1.5 times its maximum working pressure (typically 3, 6 or 7 bargauge), and regular pressure readings are taken with time until the engineer is satisfied that there is no significant leak.

The pass/fail criterion applied within British Gas plc is that the significant leak is one that represents a leakage of 0.0028 standard cubic meters per hour of gas at the maximum working pressure of the main.

For constant temperature and internal volume, the pressure drop rate caused by a leak is proportional to the leak flowrate, and inversely proportional to the internal volume of the pipework under test. In large volumes very small drop rates have to be resolved. For example, in 100 cubic meters at a 6 bar test, the pass fail drop rate is 36 microbars per hour. Using conventional instrumentation, for example capable of the order of millibar resolution at 7 bar gauge, several days duration of test are required in order to register such small drop rates.

During such extended test times, other influences such as changing ambient temperature have to be accounted for both from the instrumentation drift and test pressure change viewpoints.

For modern polyethylene gas pipe systems, in addition to temperature change, the other major influence on pressure drop rate behaviour is the creep behaviour of the pipe when pressurised, which causes a time dependent volume increase, in turn leading to a further pressure drop.

For a system with no leak and at constant temperature, the pressure drop behaviour caused by creep is independent of pipe volume, but depends upon the material grade, the pressure (stress), the Standard Dimension Ratio (SDR) (which is the outside diameter of the pipe divided by the wall thickness) and the recent stress history of the pipe. The drop rate curve is exponential in nature, eventually settling to a constant pressure as the volume changes become diminishingly small. Hence for small test volumes the drop rate due to the significant leak dominates over the drop rate due to creep, but in larger volumes the drop rate due to creep dominates in the early days of the test.

SUMMARY OF THE INVENTION

According to the invention a method of testing an isolated thermoplastic buried pipe for leakage comprises qualifying the leakage from the pipe against a pass/fail leakage criterion by eliminating the effects of temperature change and changes in the physical pipe volume due to viscoelastic behaviour of the plastic pipe.

Preferably, a computer and a differential pressure transducer are used to measure the rate of pressure change caused by the combination of leak from the pipe, temperature change and physical pipe volume change.

Preferably, the method comprises:
(i) passing air under pressure into the pipe and into a reference chamber connected to the pipe by a valve while recording at intervals of every few seconds the temperature in the reference chamber, the temperature in the pipe or in the ground adjacent the pipe, and the absolute pressure in the reference chamber;

(ii) when the test pressure has been reached closing said valve and repeatedly measuring the differential pressure between the pipe and the reference chamber;

(iii) opening the valve to equalize the pressures in the pipe and the reference chamber;

(iv) repeating steps (ii) and (iii) several times at intervals of less than half an hour; and (v) using a computer to calculate:
(a) the predicted curve relating the pressure drop in the pipe (owing to creep and leakage owing to an allowable leak) to time;

and for each set of differential pressures measured at step (ii):
(b) the rate of change with respect to time of the differential pressure between the pipe and the reference chamber (the measured differential pressure drift rate);
(c) the rate of change with respect to time of the temperature of the pipe or the adjacent ground (the test temperature drift rate);
(d) the rate of change with respect to time of the temperature of the reference chamber (the reference temperature drift rate);
(e) the rates of change with respect to time of the pressure drift rates corresponding to (c) and (d) (the predicted test pressure drift rate and the predicted reference pressure drift rate, respectively);
(f) the difference between the pressure drift rates calculated in step (e) to yield the predicted differential pressure drift rate;
the difference between (b) and (f) to yield the pressure drift rate due to creep and leak only in the pipe, independent of any temperature change in the pipe;
and
(vi) comparing the results yielded by step (g) and determining whether or not the results trend is towards crossing a curve representing a creep prediction model at the allowable leak.

BRIEF DESCRIPTION OF THE DRAWINGS

The invention will now be further described by way of example with reference to the accompanying drawings, in which:

FIG. 2 shows a graphical illustration of how results obtained can be judged according to a predicted pressure drop rate curve.

DETAILED DESCRIPTION OF PREFERRED EMBODIMENT

The Apparatus

Figure 1:
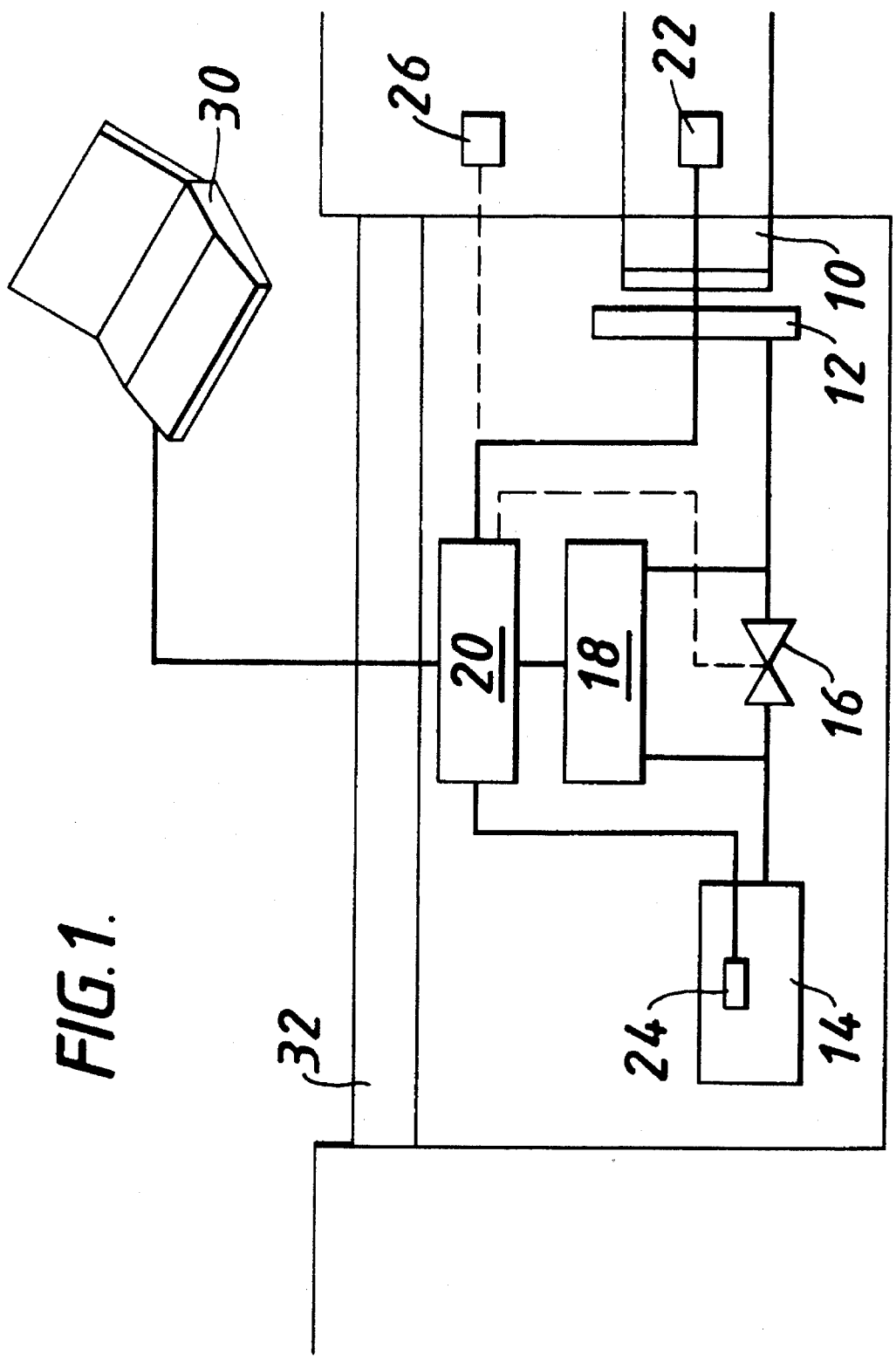
FIG. 1 shows apparatus used in performing the method according to the invention.

FIG. 1 shows a typical excavation to expose one end of a buried polyethylene gas pipe 10. The pipe 10 has been isolated and its end has been closed by a pressure-proof seal 12, as has the remote end (not shown).

The excavation contains the following items: a reference chamber 14; a valve 16 by which the reference chamber 14 can be connected to the pipe 10 or isolated therefrom when the valve 16 is closed; a differential pressure transducer 18 which is connected to measure the differential pressure between the pipe 10 and the reference chamber 14; an electronics unit 20 (which contains a computer); and platinum resistance devices 22, 24 to continuously monitor temperature in the pipe 10 and the reference chamber 14. These devices 22, 24 are connected to the unit 20. Instead of measuring the temperature in the pipe 10, it may be more convenient to measure the temperature of the adjacent soil, as shown at 26.

The unit 20 controls the opening and closing of the valve 16. The unit 20 also contains an absolute pressure transducer connected to the pipe 10. The unit 20 also contains electronic circuitry which locally conditions the temperature signals from the platinum resistance devices, performs an analogue to digital conversion and stores data.

The nominal absolute pressure is also measured by means not shown in FIG. 1.

The operation of the equipment in the excavation is automatic and, when convenient and required, data is transferred through a non-contacting interface to an interrogating portable computer 30 located outside the excavation. The excavation is closed by a layer 32 of temporary insulation.

The equipment measures pressure drop rates very accurately and in a relatively short time at pressures up to 7 bar gauge. The differential pressure transducer 18 is a commercially available instrument having a full-scale deflection of + or −0.1 millibar (+ or −1 mm $H_2O$).

The pipe 10 is pressurised by passing air into it using a compressor (not shown) and depending on the size of compressor used, and the volume of the pipe 10, pressurisation takes several hours. The reference chamber 14 is also pressurised.

The Method

Before pressurisation of the pipe 10, the equipment in the excavation is energised and during pressurisation the absolute temperature of the pipe 10 and the absolute pressure in the pipe 10 are continuously monitored. Information will also have been passed to the computer regarding the length of the pipe 10 and its SDR. Logging of the absolute temperature and the absolute pressure of the pipe continues throughout pressurisation and the data obtained is used by the computer to create a creep prediction model. This is the pressure drop in the pipe (test pressure drop) versus time curve 40 due to allowable leak of 0.0028 standard cubic meters per hour at the maximum working pressure of the main and creep of the pipe and is shown in FIG. 2.

During pressurisation the equipment automatically closes and opens the valve 16, typically, every 20 minutes so that the reference chamber 14 is also pressurised to the same pressure as the pipe 10.

The equipment measures the temperature in the reference chamber 14 by means of the device 24 once every 5 seconds. It also measures the temperature in the pipe 10 (or in the adjacent ground) by means of the device 22 (or the device 26) every 5 seconds. The absolute pressure in the reference chamber 14 is also measured at the same rate.

The differential pressure between the pipe 10 and the reference chamber 14 is measured by the transducer 18 every 5 seconds, however this is useful data only when the valve 16 is closed and is of no value during pressurisation.

When pressurisation is complete, a period of several hours is allowed to elapse which permits the temperature in the pipe 10 to revert to normal.

In what follows, it will be understood that the equipment in the excavation automatically obtains the data each time the valve 16 is closed.

The interrogating computer 30 requests data from the unit 20 at, say, some 4 hours after the completion of pressurisation.

The unit 20 has been closing the valve 16 every 20 minutes and opening the valve 16 if the transducer produces a positive or negative full-scale output. Alternatively, the valve 16 is opened if it has remained closed for more than 5 minutes.

The data sent to the computer 30 is that corresponding to the following operation of the valve 16 under the control of the unit 20:

Every 5 seconds data is collected as mentioned above. The interrogating computer 30 uses that data to find the differential pressure drift rate.

The valve 16 is opened and the pressures in the pipe 10 and the reference chamber are equalised.

The valve 16 closes and the differential pressure is logged every 5 seconds. The valve 16 opens and the pressures in the pipe 10 and the reference chamber 14 are equalised. The valve 16 again closes and again the differential pressure is logged. This process is repeated several times.

All of the data logged during the period of those several closures of the valve 16 is transferred to the computer 30.

In each period during which the valve 16 is closed the computer 30 calculates:

(a) the measured differential pressure drift rate;

(b) the rate of change with respect to time (all subsequent references to rate of change mean "with respect to time") of the temperature of the pipe 10 (or of the ground adjacent to the pipe 10). This is called the test temperature drift rate;

(c) the rate of change of the temperature of the reference chamber 14 (the reference temperature drift rate);

(d) the rates of change of the pressures corresponding to (b) and (c) (the test pressure drift rate and the reference pressure drift rate, respectively);

(e) the difference between the test pressure drift rate and the reference pressure drift rate to yield the predicted differential pressure drift rate;

(f) the difference between (a) and (e) to yield the pressure drift rate due to creep and leak only in the pipe 10 independent of any temperature change in the pipe 10;

(g) comparing or qualifying the results yielded by step (f) and determining whether or not the results trend is towards crossing the curve 40 representing the creep prediction model at the allowable leak mentioned above at the outset of the description of the Method.

One way of carrying out step (g) is to plot the results with respect to the model 40 as shown in FIG. 2. The results are indicated by X's. Then, for each result, determine the height $a_1$ of the result above a nominal horizontal line drawn on the graph comprising the model 40, determine the depth $b_1$ of the result below the curve 40, and derive the quotient $a_1/b_1$. The curve or model 40 can represent a worst case prediction.

If the values of the quotients $a_1/b_1$, $a_2/b_2$, $a_3/b_3$ ——— is decreasing, the test shows that the pipe 10 has less than the allowable leak and has "passed" the test. If the values of the quotients is increasing the test shows that the pipe 10 has more than the allowable leak and has "failed".

The results plotted may be subject to disturbing factors, such as noise, which make them very variable. In such cases graphical methods may have to be applied in order to derive the quotients just mentioned.

I claim:

1. A method of testing an isolated plastic pipe for leakage wherein the leakage from the pipe is qualified against a pass/fail leakage criterion by eliminating the effects of temperature change and changes in the physical pipe volume due to viscoelastic behavior of the plastic pipe, the method comprising:

(i) passing air under pressure into the pipe and into a reference chamber connected to the pipe by a valve while recording at intervals of every few seconds the temperature in the reference chamber, the temperature in the pipe or in the ground adjacent the pipe, and the absolute pressure in the reference chamber;

(ii) when a test pressure has been reached closing said valve and repeatedly measuring the differential pressure between the pipe and the reference chamber;

(iii) opening the valve to equalize the pressures in the pipe and the reference chamber;

(iv) repeating steps (ii) and (iii) several times at intervals of less than half an hour; and (v) using a computer to calculate:
   (a) the predicted curve relating the pressure drop in the pipe (owing to creep and leakage owing to an allowable leak) to time;

for each set of differential pressures measured at step (ii):
   (b) the rate of change with respect to time of the differential pressure between the pipe and the reference chamber (the measured differential pressure drift rate);
   (c) the rate of change with respect to time of the temperature of the pipe or the adjacent ground (the test temperature drift rate);
   (d) the rate of change with respect to time of the temperature of the reference chamber (the reference temperature drift rate);
   (e) the rates of change with respect to time of the pressure drift rates corresponding to (c) and (d) (the predicted test pressure drift rate and the predicted reference pressure drift rate, respectively);
   (f) the difference between the pressure drift rates calculated in step (e) to yield the predicted differential pressure drift rate;
   (g) the difference between (b) and (f) to yield the pressure drift rate due to creep and leak only in the pipe, independent of any temperature change in the pipe; and (vi) comparing the results yielded by step (g) and determining whether or not the results trend is towards crossing a curve representing a creep prediction model at the allowable leak.

2. A method according to claim 1, in which a computer and a differential pressure tranducer are used to measure the rate of pressure change caused by the combination of leak from the pipe, temperature change and physical pipe volume change.

\* \* \* \* \*